US012671264B2

(12) United States Patent
Fan

(10) Patent No.: US 12,671,264 B2
(45) Date of Patent: Jun. 30, 2026

(54) APPARATUS FOR POWERING A BATTERY OF AN AUDIO SYSTEM

(71) Applicant: Harman International Industries, Incorporated, Stamford, CT (US)

(72) Inventor: Linyong Fan, Shenzhen (CN)

(73) Assignee: Harman International Industries, Incorporated, Stamford, CT (US)

( * ) Notice: Subject to any disclaimer, the term of this patent is extended or adjusted under 35 U.S.C. 154(b) by 760 days.

(21) Appl. No.: 18/119,879

(22) Filed: Mar. 10, 2023

(65) Prior Publication Data

US 2024/0305125 A1     Sep. 12, 2024

(51) Int. Cl.
  *H02J 7/00*      (2026.01)
  *H01M 10/44*    (2006.01)
  *H02J 7/62*      (2026.01)
  *H02J 7/64*      (2026.01)
  *H02J 7/90*      (2026.01)
(52) U.S. Cl.
  CPC ............. *H02J 7/977* (2026.01); *H01M 10/44* (2013.01); *H02J 7/62* (2026.01); *H02J 7/64* (2026.01)
(58) Field of Classification Search
  CPC ..................................... H02J 7/00; H02J 7/64

USPC .......................................................... 320/128
See application file for complete search history.

(56)                References Cited

U.S. PATENT DOCUMENTS

| | | | | |
|---|---|---|---|---|
| 2005/0068005 A1* | 3/2005 | Yamashita | ................ | H02J 7/54 |
| | | | | 320/116 |
| 2016/0056657 A1* | 2/2016 | Hang | ...................... | H02J 7/865 |
| | | | | 320/128 |
| 2016/0064979 A1* | 3/2016 | Huang | ...................... | H02J 7/92 |
| | | | | 320/114 |
| 2018/0342774 A1* | 11/2018 | Shimada | ........... | H01M 10/4285 |
| 2024/0204329 A1* | 6/2024 | Kao | ...................... | H01M 10/46 |

* cited by examiner

*Primary Examiner* — Ahmed H Omar
(74) *Attorney, Agent, or Firm* — Burris Law, PLLC

(57)                ABSTRACT

An apparatus configured to power a battery of an audio system includes a plurality of switches, where the plurality of switches comprises a power switch and a plurality of voltage regulator switches, a microcontroller, and a voltage regulator circuit. The microcontroller is configured to determine whether the power switch is activated. The microcontroller is configured to, in response to determining the power switch is activated, activate the plurality of voltage regulator switches to electrically couple the voltage regulator circuit to the battery.

17 Claims, 4 Drawing Sheets

APPARATUS FOR POWERING A BATTERY OF AN AUDIO SYSTEM

FIELD

The present disclosure relates to an apparatus for powering a battery of an audio system.

BACKGROUND

The statements in this section merely provide background information related to the present disclosure and may not constitute prior art.

Generally, a power circuit of a battery-powered device, such as an audio system, may mainly include a battery, a charger circuit, a voltage regulator circuit, a Universal Serial Bus (USB) port, and a switch. The battery powers the audio system, and the charger circuit charges the battery via an external power source, which is connected to the audio system via the USB port. The voltage regulator circuit may convert a battery voltage to a suitable voltage for other components of the audio system. The audio system may be turned on or off via the switch, and the audio system may initiate a power-off routine when the audio system is turned off. As an example, the power-off routine includes, but is not limited to, operating in a low power mode (e.g., sleep mode) prior to discontinuing the supply of power to various components of the audio system. However, the battery may discharge a significant amount of power while the audio system operates in the low power mode.

SUMMARY

This section provides a general summary of the disclosure and is not a comprehensive disclosure of its full scope or all of its features.

The present disclosure provides an apparatus configured to power a battery of an audio system. The apparatus includes a plurality of switches, where the plurality of switches comprises a power switch and a plurality of voltage regulator switches, a microcontroller, and a voltage regulator circuit. The microcontroller is configured to determine whether the power switch is activated. The microcontroller is configured to, in response to determining the power switch is activated, activate the plurality of voltage regulator switches to electrically couple the voltage regulator circuit to the battery.

In variations of the apparatus of the above paragraph, which may be implemented individually or in any combination, the microcontroller is configured to perform a power-off routine, wherein during the power-off routine, the microcontroller is configured to: determine whether the power switch is deactivated, the voltage regulator circuit is electrically coupled to the battery, and a power-off command has been received, and broadcast a command to deactivate the plurality of voltage regulator switches in response to the power switch being deactivated, the voltage regulator circuit being electrically coupled to the battery, and the power-off command being received; the apparatus includes a delay circuit, the microcontroller is configured to determine whether the power-off routine is complete, and the delay circuit is configured to deactivate the voltage regulator switches in response to the power-off routine not being completed; the plurality of switches further comprises an audio system state switch, and where the microcontroller is configured to determine whether the power switch is activated based on a state of the audio system state switch; the apparatus includes a charging circuit configured to provide the power to the battery based on a charging control routine performed by the microcontroller; the apparatus includes one or more negative temperature coefficient (NTC) thermistors, where the one or more NTC thermistors are electrically coupled to the battery and are configured to generate resistance data that is indicative of a temperature of the battery; the charging control routine is based on the resistance data; the plurality of switches includes a charging circuit switch that electrically couples an external power supply to the charging circuit and the battery, and to perform the charging control routine, one of the microcontroller and the charging circuit is configured to: determine the temperature of the battery based on the resistance data, determine whether the temperature of the battery is less than a minimum threshold temperature or greater than a maximum threshold temperature, and deactivate the charging circuit switch in response to the temperature being less than the minimum threshold temperature or greater than the maximum threshold temperature; the apparatus includes an overvoltage protection circuit, where the plurality of switches includes a charging circuit switch that electrically couples an external power supply to the charging circuit and the battery, and the overvoltage protection circuit is electrically coupled to the charging circuit switch and the plurality of voltage regulator switches; and/or the apparatus includes an overcurrent protection circuit, where the plurality of switches includes a charging circuit switch that electrically couples an external power supply to the charging circuit and the battery, and the overcurrent protection circuit is electrically coupled to the charging circuit switch and the plurality of voltage regulator switches.

The present disclosure provides an apparatus configured to power a battery of an audio system. The apparatus includes a plurality of switches, where the plurality of switches comprises a power switch, a plurality of voltage regulator switches, and a charging circuit switch, a microcontroller, a charging circuit configured to provide the power to the battery based on a charging control routine performed by the microcontroller, and a voltage regulator circuit. The microcontroller is configured to: determine whether the power switch is activated, in response to determining the power switch is activated, activate the plurality of voltage regulator switches to electrically couple the voltage regulator circuit to the battery, obtain resistance data indicative of a temperature of the battery, and perform the charging control routine based on the resistance data.

In variations of the apparatus of the above paragraph, which may be implemented individually or in any combination, the microcontroller is configured to perform a power-off routine, wherein during the power-off routine, the microcontroller is configured to: determine whether the power switch is deactivated, the voltage regulator circuit is electrically coupled to the battery, and a power-off command has been received, and broadcast a command to deactivate the plurality of voltage regulator switches in response to the power switch being deactivated, the voltage regulator circuit being electrically coupled to the battery, and the power-off command being received; the apparatus includes a delay circuit, the microcontroller is configured to determine whether the power-off routine is complete, and the delay circuit is configured to deactivate the voltage regulator switches in response to the power-off routine not being completed; the plurality of switches further comprises an audio system state switch, and where the microcontroller is configured to determine whether the power switch is activated based on a state of the audio system state switch; the apparatus includes one or more negative temperature coefficient (NTC) thermistors, where the one or more NTC thermistors are electrically coupled to the battery and are configured to generate resistance data that is indicative of a temperature of the battery; the charging circuit switch electrically couples an external power supply to the charging circuit and the battery, and to perform the charging control routine, one of the microcontroller and the charging circuit is configured to: determine the temperature of the battery based on the resistance data, determine whether the temperature of the battery less than a minimum threshold temperature or greater than a maximum threshold temperature, and deactivate the charging circuit switch in response to the temperature being less than the minimum threshold temperature or greater than the maximum threshold temperature; the apparatus includes an overvoltage protection circuit, where the plurality of switches includes a charging circuit switch that electrically couples an external power supply to the charging circuit and the battery, and the overvoltage protection circuit is electrically coupled to the charging circuit switch and the plurality of voltage regulator switches; and/or the apparatus includes an overcurrent protection circuit, where the plurality of switches includes a charging circuit switch that electrically couples an external power supply to the charging circuit and the battery, and the overcurrent protection circuit is electrically coupled to the charging circuit switch and the plurality of voltage regulator switches.

The present disclosure provides a method for controlling an apparatus to power a battery of an audio system, the apparatus comprising plurality of switches, a microcontroller, and a voltage regulator circuit, where the plurality of switches comprises a power switch and a plurality of voltage regulator switches. The method includes determining whether the power switch is activated, in response to determining the power switch is activated, activating the plurality of voltage regulator switches to electrically couple the voltage regulator circuit to the battery, and deactivating the power switch in response to electrically coupling the voltage regulator circuit to the battery.

In variations of the method of the above paragraph, the method includes determining whether the power switch is deactivated, the voltage regulator circuit is electrically coupled to the battery, and a power-off command has been received, and broadcasting a command to deactivate the plurality of voltage regulator switches in response to the power switch being deactivated, the voltage regulator circuit being electrically coupled to the battery, and the power-off command being received.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
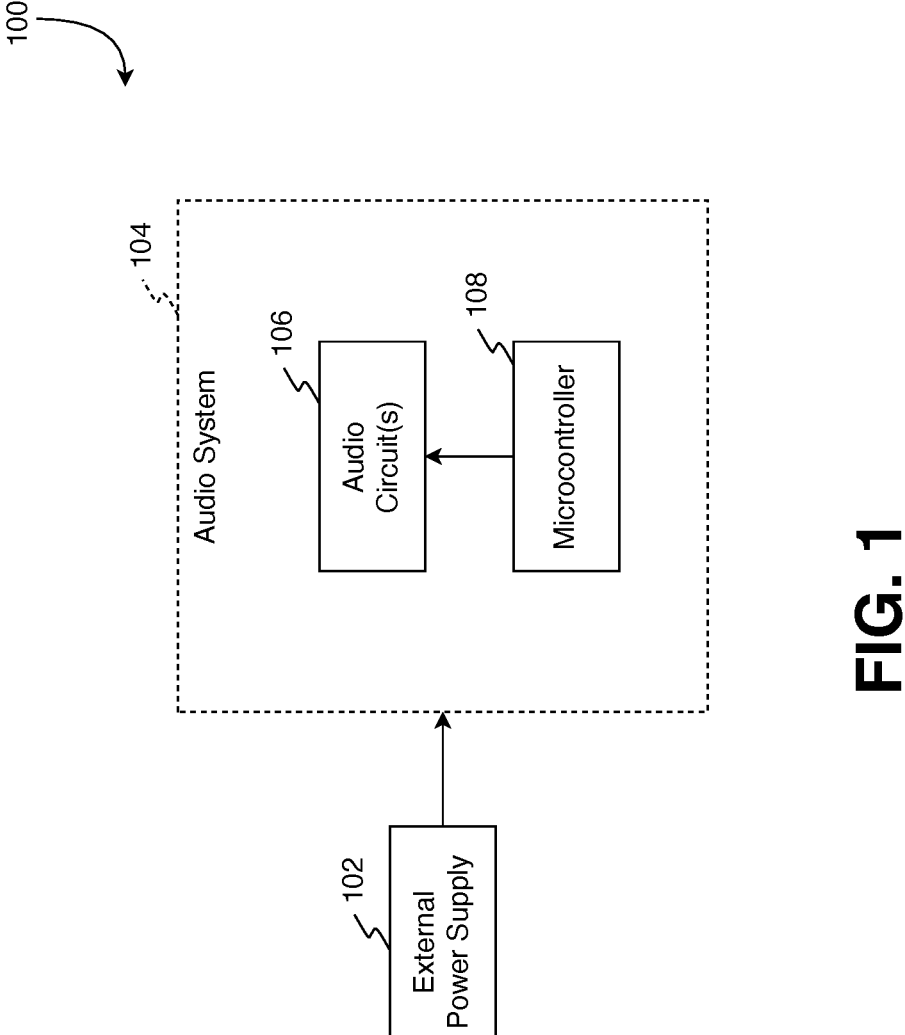
FIG. 1 is a functional block diagram of an example power supply and an audio system in accordance with the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure provides an apparatus configured to power a battery of an audio system. The apparatus includes a power switch, a plurality of voltage regulator switches, a microcontroller, and a voltage regulator circuit. The microcontroller is configured to, in response to determining the power switch is activated, activate the plurality of voltage regulator switches to electrically couple the voltage regulator circuit to the battery. As described below in further detail, the apparatus disclosed herein provides for an audio system that does not consume power (except for the battery) after the audio system is turned off, thereby enabling the microcontroller to successfully initiate and complete a power-off routine before the audio system is turned off.

Referring to FIG. 1, an environment 100 is shown and includes an external power supply 102 (e.g., a direct current (DC) or alternating current (AC) power supply) and an audio system 104. The audio system 104 may be a headphone or other user-wearable audio system, a portable audio system, home audio system, or a vehicle audio system. It should be understood that the audio system 104 can be provided by various types of audio systems and is not limited to the examples described herein.

In one embodiment, the audio system 104 includes a microcontroller 108 and one or more audio circuits 106 that are configured to broadcast audio signals generated by the microcontroller 108. As an example, the microcontroller 108 may include a transceiver circuit that receives audio commands from an audio control device (e.g., a smartphone, a desktop computer, a laptop, a tablet, among other computing systems) via a wired or a wireless communication protocol (e.g., a Bluetooth®-type protocol, a cellular protocol, a wireless fidelity (Wi-Fi)-type protocol, a near-field communication (NFC) protocol, a UWB protocol, among others). Subsequently, the microcontroller 108 controls the one or more audio circuits 106 to broadcast audio signals corresponding to the audio commands. To perform the functionality described herein, the one or more audio circuits 106 may include various speaker circuits/components, operational amplifier circuits, capacitors, inductors, resistors, integrated circuits, switches (e.g., transistors), transducers, and/or other known audio electronic components. Furthermore, the audio control device may include one or more transceivers, one or more processors, and one or more nontransitory computer-readable mediums (e.g., a random-access memory (RAM) and a read-only memory (ROM)) to perform the functionality described herein.

Figure 2:
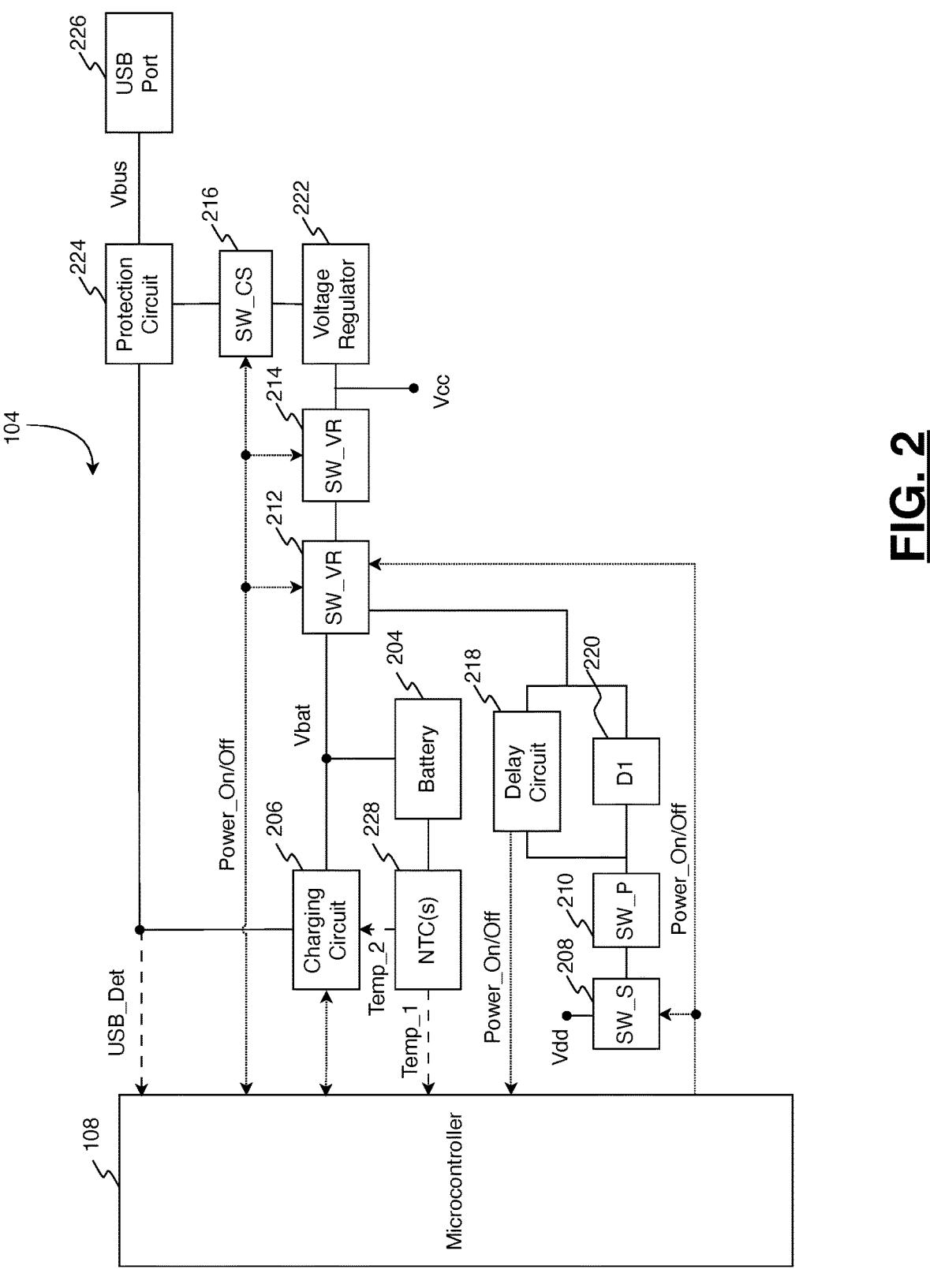
FIG. 2 is a functional block diagram of an audio system in accordance with the teachings of the present disclosure.

Referring to FIG. 2, the audio system 104 may further include a battery 204, a charging circuit 206, an audio system state switch 208 (denoted as "SW_S" in FIG. 2), a power switch 210 (denoted as "SW_P" in FIG. 2), voltage regulator switches 212, 214 (denoted as "SW_VR" in FIG. 2), and a charging circuit switch 216 (denoted as "SW_CS" in FIG. 2). The audio system state switch 208, the power switch 210, the voltage regulator switches 212, 214, and/or the charging circuit switch 216 may be collectively referred to hereinafter as "the plurality of switches." Furthermore, the audio system 104 may include a delay circuit 218, a diode 220, a voltage regulator circuit 222, a protection circuit 224, a charging port 226, and one or more negative temperature coefficient (NTC) thermistors 228.

In one embodiment, the battery 204 is configured to store electrical energy/power and provide electrical energy/power to various components of the audio system 104. As an example, the battery 204 is provided by a rechargeable and/or removeable battery that is configured to receive power from the external power supply 102 via the USB port 226 (Vbus) when the audio system 104 is electrically coupled to the external power supply 102, as indicated by USB_DET in FIG. 2.

In one embodiment, the charging circuit 206 is provided by known audio charging circuits that are configured to control the amount of power that is provided to the battery 204 from the external power supply 102 based on a charging control routine performed by the microcontroller 108 and/or the charging circuit 206. The charging circuit 206 and the microcontroller 108 may be communicably coupled via an Inter-Integrated Circuit (I2C) protocol, Serial Peripheral Interface (SPI) protocol, general-purpose input/output (GPIO) protocol, or other known communication protocols. Additional details regarding the charging control routine are provided below with reference to FIG. 4.

In one embodiment, the power switch 210 is a pushbutton switch that is actuated by at least a button press operation. As an example, the power switch 210 is actuated by the button press operation, a holding operation (e.g., holding the button in a pressed position for a predetermined period of time), and a release operation to thereby set the power switch 210 in the "ON" state. The audio system state switch 208 and the power switch 210 may be coupled to the battery 204 and the external power supply 102. In one embodiment, the audio system state switch 208, the voltage regulator switches 212, 214 and the charging circuit switch 216 are provided by electronic switches, such as a triode switch or a transistor (e.g., a metal oxide silicone field effect transistor (MOSFET), a junction field effect transistor (JFET), a bipolar junction transistor (BJT), among other types of transistors). Furthermore, the microcontroller 108 is configured to selectively provide a biasing voltage to the voltage regulator switches 212, 214 and the charging circuit switch 216 and thereby set the respective switches in one of the "ON" state and the "OFF" state. Additional details regarding the control of the plurality of switches by the microcontroller 108 are provided below with reference to FIG. 3.

In one embodiment, the delay circuit 218 is configured to provide a delay signal to the voltage regulator switches 212, 214 to thereby deactivate the voltage regulator switches 212, 214 after a predetermined delay period (i.e., the delay signal sets the voltage regulator switches 212, 214 to the "OFF" state). The delay circuit 218 may be provided by, for example, an integrated circuit (e.g., a long delay integrated circuit, such as one or more 555 timer integrated circuits), a resistor-capacitor (RC) delay circuit, a monostable delay circuit, a transistor delay circuit, and/or other known delay circuits. In one embodiment, the diode 220 is configured to selectively isolate the microcontroller 108, the power switch 210, and the audio system state switch 208 from the voltage regulator switches 212, 214, the charging circuit switch 216, the voltage regulator circuit 222, and the charging circuit 206.

In one embodiment, the voltage regulator circuit 222 is configured to convert a supply voltage (e.g., Vcc) to a voltage value that is suitable for one or more additional components of the audio system 104 and may be provided by, for example, a buck converter circuit, a voltage converter integrated circuit, or other types of voltage regulator circuits.

In one embodiment, the protection circuit 224 electrically couples the external power supply 102 and the USB port 226 to the charging circuit switch 216, the microcontroller 108, and the voltage regulator circuit 222, and the protection circuit 224 includes at least one of an overvoltage protection circuit and an overcurrent protection circuit. The overvoltage protection circuit and/or the overcurrent protection circuits may be provided by, for example, known overvoltage and overcurrent integrated circuits. When the voltage and/or current provided by the external power supply 102 is higher than an overvoltage or overcurrent threshold, the microcontroller 108 deactivates the charging circuit switch 216 to thereby disconnect the external power supply 102 from the audio system 104.

In one embodiment, the one or more NTC thermistors 228 are electrically coupled to the battery 204 and are configured to generate resistance data that is indicative of a temperature of the battery 204 (Temp_1 and Temp_2 in FIG. 2). That is, the resistance of the NTC thermistors 228 may vary as a function of the temperature of the battery 204. As described below in further detail with reference to FIG. 4, the microcontroller 108 and/or the charging circuit 206 are configured to perform a charging control routine to determine a temperature of the battery 204 based on the resistance data and control the charging operation performed by the charging circuit 206.

Figure 3:
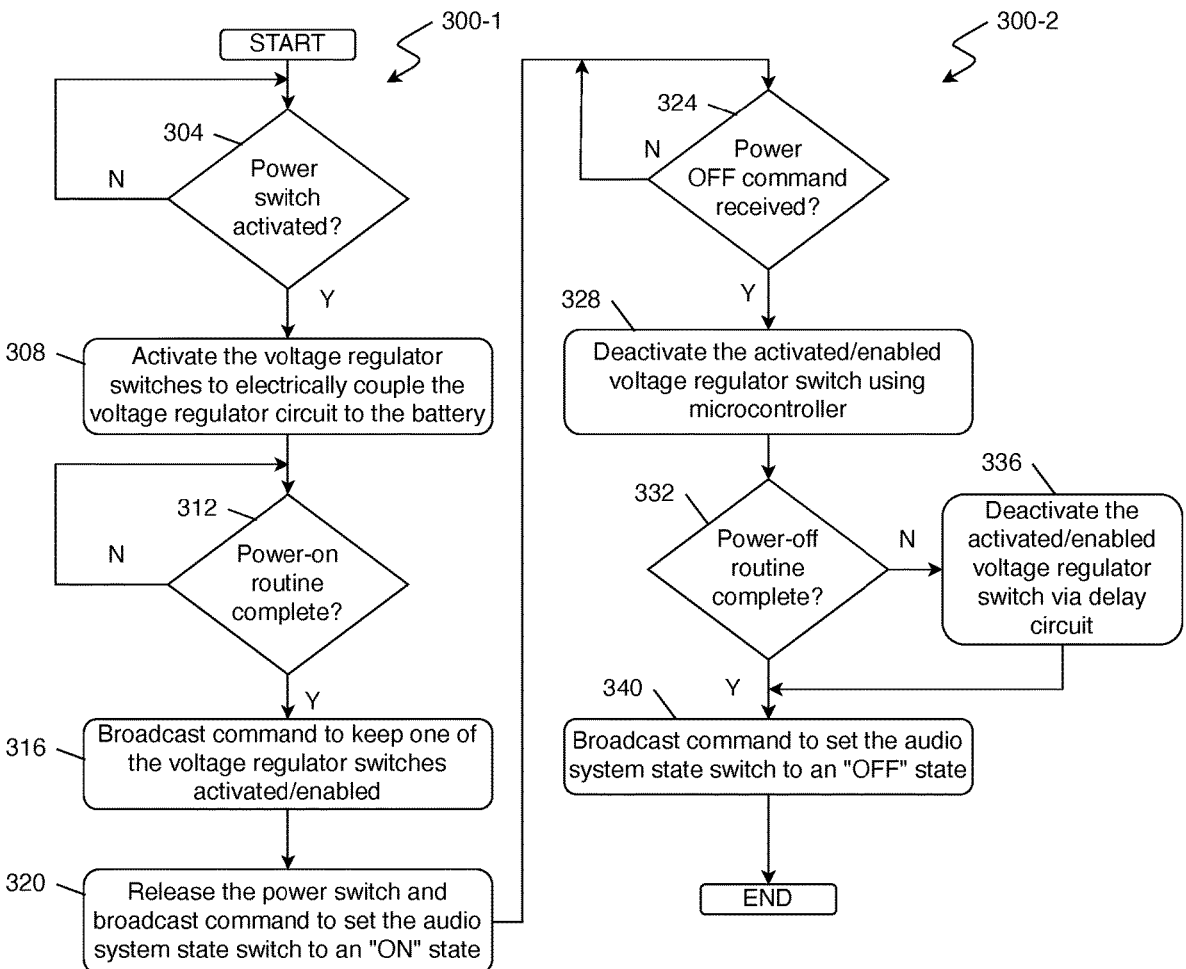
FIG. 3 is a flowchart illustrating an example power routine for powering a battery of an audio system in accordance with the teachings of the present disclosure.

In one embodiment and referring to FIGS. 2-3, the microcontroller 108 is configured to perform a power-on routine 300-1 and a power-off routine 300-2 (collectively referred to herein as "the power routine 300"). The microcontroller 108 and an operator of the audio system 104 may collectively perform steps 304, 308, 312, 316 and 320 to perform the power-on routine 300-1, and the microcontroller 108, the delay circuit 218, and the operator may collectively perform steps 324, 328, 332, 336, and 340 to perform the power-off routine 300-2.

At 304, the microcontroller 108 may determine whether the power switch 210 is activated. As a more specific example, the microcontroller 108 may determine whether the press and hold operation of the pushbutton switch (as the power switch 210) were performed at 304. In response to determining that the power switch 210 is not activated at 304, the power-on routine 300-1 remains at 304. In response to determining that the power switch 210 is activated at 304, the power-on routine 300-1 proceeds to 308, where microcontroller 108 activates the voltage regulator switch 212 and subsequently activates the voltage regulator switch 214, as indicated by the PWR_ON/OFF signals in FIG. 2. By sequentially activating the voltage regulator switches 212, 214, the battery 204 is thereby electrically coupled to the voltage regulator circuit 222. Furthermore, a battery voltage of the battery 204 (Vbat) is set to the supply voltage (Vcc) via the voltage regulator switches 212, 214.

At 312, the microcontroller 108 determines whether the power-on routine is complete. If so, the power-on routine 300-1 proceeds to 316, where the microcontroller 108 broadcasts a command to keep one of the voltage regulator switches 212, 214 (e.g., the voltage regulator switch 212)

activated/enabled. Otherwise, the power-on routine 300-1 remains at 312. At 320, the operator releases the power switch 210, and the microcontroller 108 broadcasts a command to set the audio system state switch 208 to the "ON" state (i.e., the audio system state switch is set to the microcontroller 108 voltage (Vdd)).

To perform the power-off routine 300-2, the microcontroller 108 may determine, at 324, whether a power-off command has been received when the voltage regulator circuit 222 is electrically coupled to the battery 204. As an example, the microcontroller 108 determines whether the press and released operation of the pushbutton switch (as the power switch 210) were performed, as indicated by the PWR_ON/OFF signals in FIG. 2. In response to determining that the power switch 210 is deactivated, the microcontroller 108 deactivates the activated voltage regulator switch (e.g., the voltage regulator switch 212) at 328. Otherwise, the power-off routine 300-2 remains at 324. By deactivating the voltage regulator switch 212, the voltage regulator switch 214 is also deactivated, thereby disconnecting the voltage regulator circuit 222 from the battery 204. At 332, the microcontroller 108 determines whether the power-off routine is complete. That is, the microcontroller 108 determines whether the voltage regulator switches 212, 214 were successfully deactivated by the microcontroller 108. If so, the power-off routine 300-2 proceeds to 340, where the microcontroller 108 broadcasts a command to set the audio system state switch 208 to the "OFF" state. Otherwise, the power-off routine 300-2 proceeds to 336, where the delay circuit 218 outputs a delayed signal to deactivate the voltage regulator switches 212, 214, and the power-off routine 300-2 then proceeds to 340.

Figure 4:
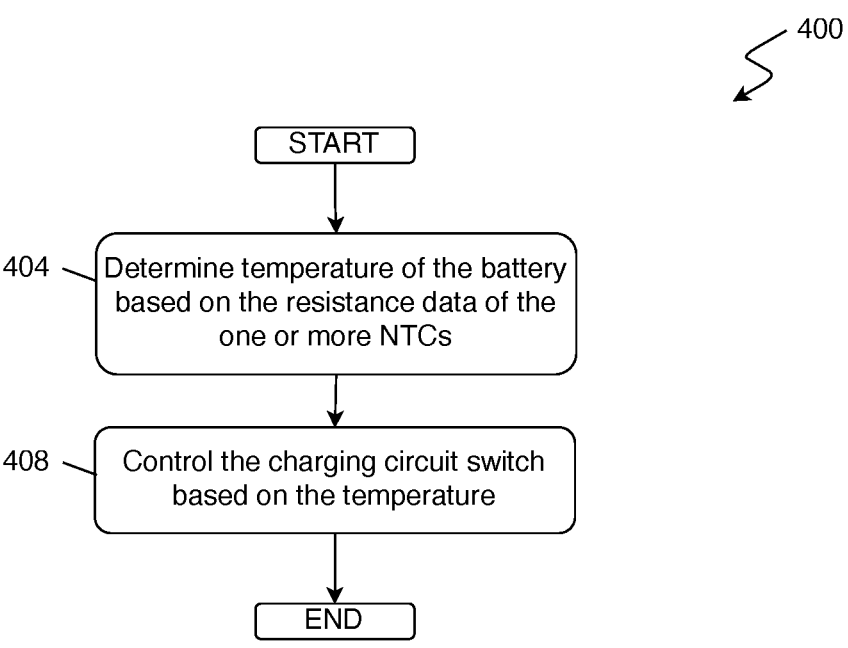
FIG. 4 is a flowchart illustrating an example charging control routine in accordance with the teachings of the present disclosure.

Referring to FIGS. 2 and 4, an example charging control routine 400 performed by the microcontroller 108 or the charging circuit 206 is shown. The charging control routine may be performed by the microcontroller 108 when the audio system 104 is in the "ON" state and by the charging circuit 206 when the audio system 104 is in the "OFF" state. Furthermore, the charging control routine may be defined based on various charging parameters for each of the "ON/OFF" states, such as a charging voltage parameter, a precharging current parameter, a charging termination current parameter, a recharging threshold voltage parameter, a charging safety timer parameter, a pre-charging safety timer parameter, among other known charging parameters.

At 404, the microcontroller 108 or the charging circuit 206 determine the temperature of the battery 204 based on the resistance data. As an example, the microcontroller 108 or the charging circuit 206 perform known NTC resistance-to-temperature routines to determine the temperature of the battery 204. At 408, the microcontroller 108 or the charging circuit 206 control the charging circuit switch 216 based on the temperature data.

As an example, the microcontroller 108 or the charging circuit 206 determines whether the temperature of the battery is less than a minimum threshold temperature (e.g., 0 degrees Celsius) or greater than a maximum threshold temperature (e.g., 45 degrees Celsius) and deactivates the charging circuit switch 216 in response to the temperature being less than the minimum threshold temperature or greater than the maximum threshold temperature. As another example, the microcontroller 108 or the charging circuit 206 determines whether the temperature of the battery is within a first temperature range (e.g., 0-10 degrees Celsius), a second temperature range (e.g., 10-40 degrees Celsius), or a third temperature range (e.g., 40-45 degrees Celsius) and controls a magnitude of the charging current based on the determined temperature range. Additional details regarding the charging control routine 400 are described in U.S. patent Ser. No. 17/659,989 titled "POWER CIRCUIT FOR BATTERY POWERED WEARABLE DEVICE," which is commonly owned with the present application and the contents of which are incorporated herein by reference in its entirety.

Based on the foregoing, the following provides a general overview of the present disclosure and is not a comprehensive summary. In a first embodiment A1, an apparatus configured to power a battery of an audio system includes a plurality of switches, where the plurality of switches comprises a power switch and a plurality of voltage regulator switches, a microcontroller, and a voltage regulator circuit. The microcontroller is configured to determine whether the power switch is activated. The microcontroller is configured to, in response to determining the power switch is activated, activate the plurality of voltage regulator switches to electrically couple the voltage regulator circuit to the battery.

In a second embodiment A2, which may include the first embodiment A1, the microcontroller is configured to perform a power-off routine, wherein during the power-off routine, the microcontroller is configured to: determine whether the power switch is deactivated, the voltage regulator circuit is electrically coupled to the battery, and a power-off command has been received, and broadcast a command to deactivate the plurality of voltage regulator switches in response to the power switch being deactivated, the voltage regulator circuit being electrically coupled to the battery, and the power-off command being received. In a third embodiment A3, which may include any combination of the first through second embodiments A1-A2, the apparatus includes a delay circuit, the microcontroller is configured to determine whether the power-off routine is complete, and the delay circuit is configured to deactivate the voltage regulator switches in response to the power-off routine not being completed. In a fourth embodiment A4, which may include any combination of the first through third embodiments A1-A3, the plurality of switches further comprises an audio system state switch, and where the microcontroller is configured to determine whether the power switch is activated based on a state of the audio system state switch.

In a fifth embodiment A5, which may include any combination of the first through fourth embodiments A1-A4, the apparatus includes a charging circuit configured to provide the power to the battery based on a charging control routine performed by the microcontroller. In a sixth embodiment A6, which may include any combination of the first through fifth embodiments A1-A5, the apparatus includes one or more negative temperature coefficient (NTC) thermistors, where the one or more NTC thermistors are electrically coupled to the battery and are configured to generate resistance data that is indicative of a temperature of the battery. In a seventh embodiment A7, which may include any combination of the first through sixth embodiments A1-A6, the charging control routine is based on the resistance data. In an eighth embodiment A8, which may include any combination of the first through seventh embodiments A1-A7, the plurality of switches includes a charging circuit switch that electrically couples an external power supply to the charging circuit and the battery, and to perform the charging control routine, one of the microcontroller and the charging circuit is configured to: determine the temperature of the battery based on the resistance data, determine whether the temperature of the battery is less than a minimum threshold temperature or greater than a maximum threshold temperature, and deactivate the charging circuit switch in response to the temperature being less than the minimum threshold temperature or greater than the maximum threshold temperature.

In a ninth embodiment A9, which may include any combination of the first through eighth embodiments A1-A8, the apparatus includes an overvoltage protection circuit, where the plurality of switches includes a charging circuit switch that electrically couples an external power supply to the charging circuit and the battery, and the overvoltage protection circuit is electrically coupled to the charging circuit switch and the plurality of voltage regulator switches. In a tenth embodiment A10, which may include any combination of the first through ninth embodiments A1-A9, the apparatus includes an overcurrent protection circuit, where the plurality of switches includes a charging circuit switch that electrically couples an external power supply to the charging circuit and the battery, and the overcurrent protection circuit is electrically coupled to the charging circuit switch and the plurality of voltage regulator switches.

In an eleventh embodiment A11, an apparatus configured to power a battery of an audio system includes a plurality of switches, where the plurality of switches comprises a power switch, a plurality of voltage regulator switches, and a charging circuit switch, a microcontroller, a charging circuit configured to provide the power to the battery based on a charging control routine performed by the microcontroller, and a voltage regulator circuit. The microcontroller is configured to: determine whether the power switch is activated, in response to determining the power switch is activated, activate the plurality of voltage regulator switches to electrically couple the voltage regulator circuit to the battery, obtain resistance data indicative of a temperature of the battery, and perform the charging control routine based on the resistance data.

In a twelfth embodiment A12, which may include the eleventh embodiment A11, the microcontroller is configured to perform a power-off routine, wherein during the power-off routine, the microcontroller is configured to: determine whether the power switch is deactivated, the voltage regulator circuit is electrically coupled to the battery, and a power-off command has been received, and broadcast a command to deactivate the plurality of voltage regulator switches in response to the power switch being deactivated, the voltage regulator circuit being electrically coupled to the battery, and the power-off command being received. In a thirteenth embodiment A13, which may include any combination of the eleventh through twelfth embodiments A11-A12, the apparatus includes a delay circuit, the microcontroller is configured to determine whether the power-off routine is complete, and the delay circuit is configured to deactivate the voltage regulator switches in response to the power-off routine not being completed. In a fourteenth embodiment A14, which may include any combination of the eleventh through thirteenth embodiments A11-A13, the plurality of switches further comprises an audio system state switch, and where the microcontroller is configured to determine whether the power switch is activated based on a state of the audio system state switch.

In a fifteenth embodiment A15, which may include any combination of the eleventh through fourteenth embodiments A11-A14, the apparatus includes one or more negative temperature coefficient (NTC) thermistors, where the one or more NTC thermistors are electrically coupled to the battery and are configured to generate resistance data that is indicative of a temperature of the battery. In a sixteenth embodiment A16, which may include any combination of the eleventh through fifteenth embodiments A11-A15, the charging circuit switch electrically couples an external power supply to the charging circuit and the battery, and to perform the charging control routine, one of the microcontroller and the charging circuit is configured to: determine the temperature of the battery based on the resistance data, determine whether the temperature of the battery less than a minimum threshold temperature or greater than a maximum threshold temperature, and deactivate the charging circuit switch in response to the temperature being less than the minimum threshold temperature or greater than the maximum threshold temperature.

In a seventeenth embodiment A17, which may include any combination of the eleventh through sixteenth embodiments A11-A16, the apparatus includes an overvoltage protection circuit, where the plurality of switches includes a charging circuit switch that electrically couples an external power supply to the charging circuit and the battery, and the overvoltage protection circuit is electrically coupled to the charging circuit switch and the plurality of voltage regulator switches. In an eighteenth embodiment A18, which may include any combination of the eleventh through seventeenth embodiments A11-A17, the apparatus includes an overcurrent protection circuit, where the plurality of switches includes a charging circuit switch that electrically couples an external power supply to the charging circuit and the battery, and the overcurrent protection circuit is electrically coupled to the charging circuit switch and the plurality of voltage regulator switches.

In a nineteenth embodiment A19, a method for controlling an apparatus to power a battery of an audio system, the apparatus comprising plurality of switches, a microcontroller, and a voltage regulator circuit, where the plurality of switches comprises a power switch and a plurality of voltage regulator switches includes determining whether the power switch is activated, in response to determining the power switch is activated, activating the plurality of voltage regulator switches to electrically couple the voltage regulator circuit to the battery, and deactivating the power switch in response to electrically coupling the voltage regulator circuit to the battery. In a twentieth embodiment A20, which may include the nineteenth embodiment A19, the method includes determining whether the power switch is deactivated, the voltage regulator circuit is electrically coupled to the battery, and a power-off command has been received, and broadcasting a command to deactivate the plurality of voltage regulator switches in response to the power switch being deactivated, the voltage regulator circuit being electrically coupled to the battery, and the power-off command being received.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. An apparatus configured to power a battery of an audio system, the apparatus comprising:
a plurality of switches, wherein the plurality of switches comprises a power switch and a plurality of voltage regulator switches;
a microcontroller; and
a voltage regulator circuit, wherein the microcontroller is configured to:
determine whether the power switch is activated;
in response to determining the power switch is activated, activate the plurality of voltage regulator switches to electrically couple the voltage regulator circuit to the battery; and
initiate a power-off routine; and
a delay circuit that is configured to deactivate the voltage regulator switches in response to the power-off routine not being successfully completed.

2. The apparatus of claim 1, wherein the microcontroller is configured to perform a power-off routine, wherein during the power-off routine, the microcontroller is configured to:
determine whether a power-off command has been received when the voltage regulator circuit is electrically coupled to the battery; and
broadcast a command to deactivate the plurality of voltage regulator switches in response to the power-off command being received when the voltage regulator circuit is electrically coupled to the battery.

3. The apparatus of claim 1, wherein the plurality of switches further comprises an audio system state switch, and wherein the microcontroller is configured to determine whether the power switch is activated based on a state of the audio system state switch.

4. The apparatus of claim 1 further comprising a charging circuit configured to provide the power to the battery based on a charging control routine performed by the microcontroller.

5. The apparatus of claim 4 further comprising one or more negative temperature coefficient (NTC) thermistors, wherein the one or more NTC thermistors are electrically coupled to the battery and are configured to generate resistance data that is indicative of a temperature of the battery.

6. The apparatus of claim 5, wherein the charging control routine is based on the resistance data.

7. The apparatus of claim 5, wherein:
the plurality of switches includes a charging circuit switch that electrically couples an external power supply to the charging circuit and the battery; and
to perform the charging control routine, one of the microcontroller and the charging circuit is configured to:
determine the temperature of the battery based on the resistance data;
determine whether the temperature of the battery is less than a minimum threshold temperature or greater than a maximum threshold temperature; and
deactivate the charging circuit switch in response to the temperature being less than the minimum threshold temperature or greater than the maximum threshold temperature.

8. The apparatus of claim 4 further comprising an overvoltage protection circuit, wherein:
the plurality of switches includes a charging circuit switch that electrically couples an external power supply to the charging circuit and the battery; and
the overvoltage protection circuit is electrically coupled to the charging circuit switch and the plurality of voltage regulator switches.

9. The apparatus of claim 4 further comprising an overcurrent protection circuit, wherein:
the plurality of switches includes a charging circuit switch that electrically couples an external power supply to the charging circuit and the battery; and
the overcurrent protection circuit is electrically coupled to the charging circuit switch and the plurality of voltage regulator switches.

10. An apparatus configured to power a battery of an audio system, the apparatus comprising:
a plurality of switches, wherein the plurality of switches comprises a power switch, a plurality of voltage regulator switches, and a charging circuit switch;
a microcontroller;
a charging circuit configured to provide the power to the battery based on a charging control routine performed by the microcontroller; and
a voltage regulator circuit, wherein the microcontroller is configured to:
determine whether the power switch is activated;
in response to determining the power switch is activated, activate the plurality of voltage regulator switches to electrically couple the voltage regulator circuit to the battery;
obtain resistance data indicative of a temperature of the battery;
perform the charging control routine based on the resistance data; and
initiate a power-off routine; and

a delay circuit that is configured to deactivate the voltage regulator switches in response to the power-off routine not being successfully completed.

11. The apparatus of claim 10, wherein the microcontroller is configured to perform a power-off routine, wherein during the power-off routine, the microcontroller is configured to:

determine whether a power-off command has been received when the voltage regulator circuit is electrically coupled to the battery; and broadcast a command to deactivate the plurality of voltage regulator switches in response to the power-off command being received when the voltage regulator circuit is electrically coupled to the battery.

12. The apparatus of claim 10, wherein the plurality of switches further comprises an audio system state switch, and wherein the microcontroller is configured to determine whether the power switch is activated based on a state of the audio system state switch.

13. The apparatus of claim 10 further comprising one or more negative temperature coefficient (NTC) thermistors, wherein the one or more NTC thermistors are electrically coupled to the battery and are configured to generate resistance data that is indicative of a temperature of the battery.

14. The apparatus of claim 13, wherein:

the charging circuit switch electrically couples an external power supply to the charging circuit and the battery; and to perform the charging control routine, one of the microcontroller and the charging circuit is configured to:

determine the temperature of the battery based on the resistance data;

determine whether the temperature of the battery less than a minimum threshold temperature or greater than a maximum threshold temperature; and deactivate the charging circuit switch in response to the temperature being less than the minimum threshold temperature or greater than the maximum threshold temperature.

15. The apparatus of claim 10 further comprising an overvoltage protection circuit, wherein:

the plurality of switches includes a charging circuit switch that electrically couples an external power supply to the charging circuit and the battery; and the overvoltage protection circuit is electrically coupled to the charging circuit switch and the plurality of voltage regulator switches.

16. The apparatus of claim 10 further comprising an overcurrent protection circuit, wherein:

the plurality of switches includes a charging circuit switch that electrically couples an external power supply to the charging circuit and the battery; and the overcurrent protection circuit is electrically coupled to the charging circuit switch and the plurality of voltage regulator switches.

17. A method for controlling an apparatus to power a battery of an audio system, the apparatus comprising plurality of switches, a microcontroller, a delay circuit, and a voltage regulator circuit, wherein the plurality of switches comprises a power switch and a plurality of voltage regulator switches, the method comprising:

determining, by the microcontroller, whether the power switch is activated;

in response to determining the power switch is activated, activating, by the microcontroller, the plurality of voltage regulator switches to electrically couple the voltage regulator circuit to the battery;

deactivating, by the microcontroller, the power switch in response to electrically coupling the voltage regulator circuit to the battery;

broadcasting, by the microcontroller, a command to deactivate the plurality of voltage regulator switches in response to the power switch being deactivated;

determining, by the microcontroller, whether the plurality of voltage regulator switches are deactivated in response to broadcasting the command; and deactivating, by the delay circuit, the voltage regulator switches in response to determining the plurality of voltage regulator switches are not deactivated.

* * * * *